United States Patent
Readwin et al.

(10) Patent No.: US 8,819,916 B2
(45) Date of Patent: Sep. 2, 2014

(54) METHOD FOR MAKING A TUBE BUNDLE

(75) Inventors: Michael J. Readwin, Metamora, MI (US); Richard E Bartos, Davison, MI (US)

(73) Assignee: GM Global Technology Operations LLC, Detroit, MI (US)

(*) Notice: Subject to any disclaimer, the term of this patent is extended or adjusted under 35 U.S.C. 154(b) by 191 days.

(21) Appl. No.: 13/297,732

(22) Filed: Nov. 16, 2011

(65) Prior Publication Data
US 2013/0118630 A1 May 16, 2013

(51) Int. Cl.
*B29C 45/14* (2006.01)
*B29C 53/08* (2006.01)
*F16L 9/19* (2006.01)
*B29C 47/00* (2006.01)
*B29C 45/00* (2006.01)

(52) U.S. Cl.
CPC ..... *B29C 45/0055* (2013.01); *B29C 2045/0058* (2013.01); *B29C 53/083* (2013.01); *F16L 9/20* (2013.01); *B29C 45/14467* (2013.01); *B29C 45/14385* (2013.01); *B29C 47/00* (2013.01)
USPC .......................... 29/527.1; 29/282; 29/890.03

(58) Field of Classification Search
CPC ........... B29K 2021/00; B29K 2007/00; B29C 43/18; B29C 45/14; B29C 47/02; B29C 46/1671; F28D 1/047; F28D 1/053; F28D 1/05308; F28D 1/05316; B23P 15/26; F28F 2255/143; F28F 2255/146
USPC ............ 29/527.1, 527.2, 890.053, 34 R, 282, 29/890.03, 890.043
See application file for complete search history.

(56) References Cited

U.S. PATENT DOCUMENTS

| | | | | |
|---|---|---|---|---|
| 3,961,010 | A * | 6/1976 | Holmes | 264/221 |
| 4,011,652 | A * | 3/1977 | Black | 29/455.1 |
| 4,896,410 | A * | 1/1990 | Spitzmesser et al. | 29/890.043 |
| 5,573,283 | A * | 11/1996 | Sellers et al. | 285/93 |
| 7,726,025 | B2 * | 6/2010 | Lee | 29/890.043 |
| 2005/0051314 | A1 * | 3/2005 | Heier | 165/173 |
| 2006/0108705 | A1 * | 5/2006 | Rowley | 264/150 |
| 2009/0018629 | A1 * | 1/2009 | Yoshida et al. | 607/113 |
| 2010/0269343 | A1 * | 10/2010 | Ward et al. | 29/890.03 |

* cited by examiner

*Primary Examiner* — David Bryant
*Assistant Examiner* — Jun Yoo

(57) ABSTRACT

A plurality of tubes are connected in a bundle that is bent to follow a curved tortuous path. The method includes providing a plurality of individual tubes and then encapsulating the tubes within a molded or extruded encapsulating material so that the tubes are joined and supported together in a tube assembly. Connectors are provided on the ends of the tubes, either before or after the encapsulating of the tubes. The tube assembly is then bent to the desired bent tortuous shape.

20 Claims, 3 Drawing Sheets

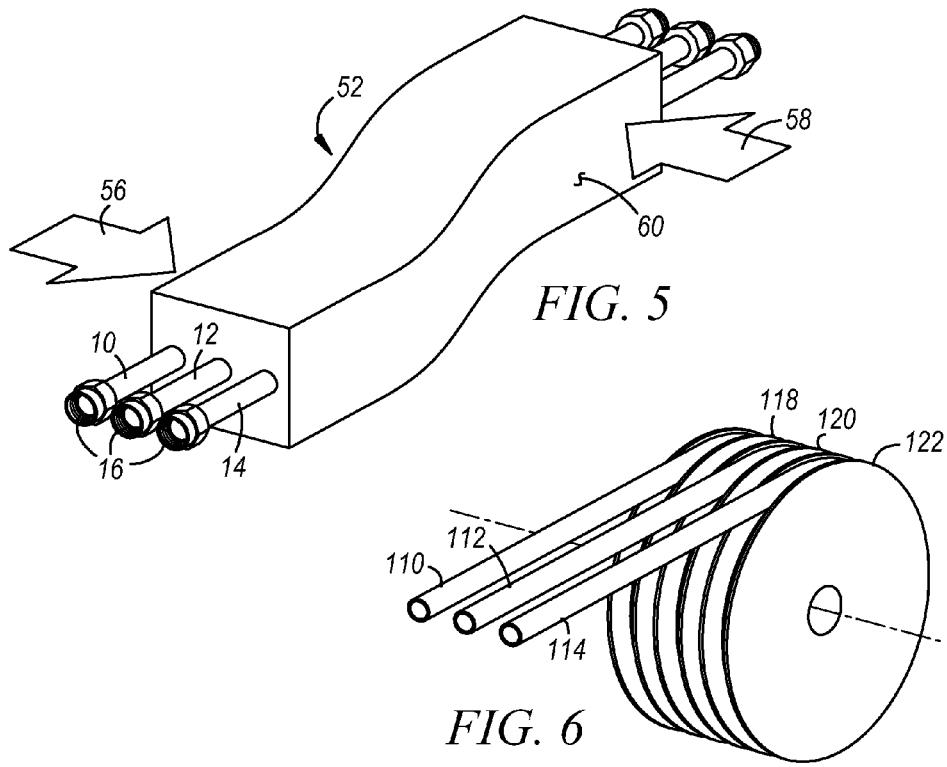
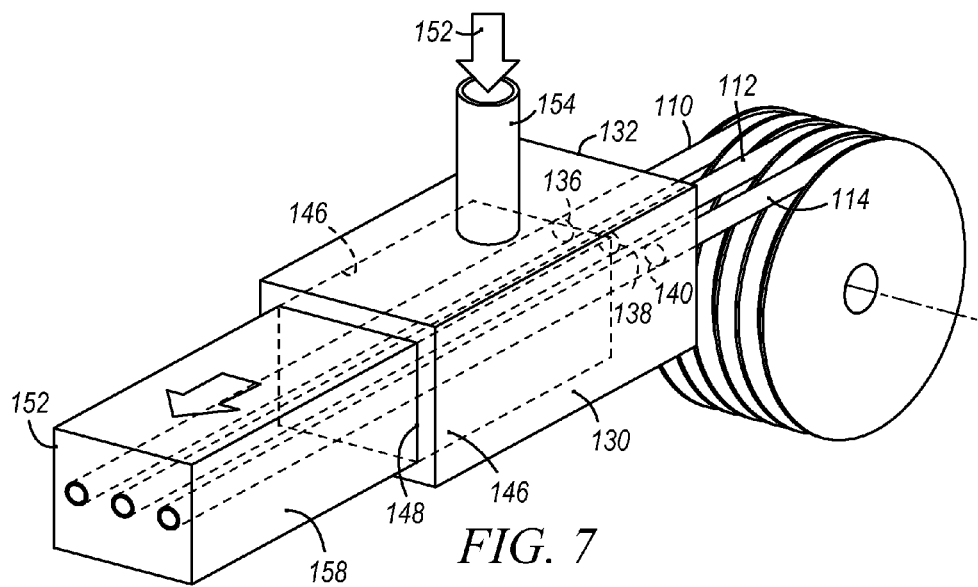

METHOD FOR MAKING A TUBE BUNDLE

FIELD OF THE INVENTION

The present invention relates to improvements in the routing of tubes in a motor vehicle and more particularly provides a method for making a tube bundle that mounts and protects a plurality of bent tubes.

BACKGROUND OF THE INVENTION

Many articles of modern manufacture, such as motor vehicles, aircraft, and household appliances employ a plurality of tubes or pipes to carry fluids such as refrigerants, brake fluid, water, hydraulic fluid, liquid or gaseous fuels, etc, between various components such as brakes, engines, tanks, compressors, etc. The individual tubes are routed through the vehicle or appliance. It is known to bend the individual tubes to a desired shape that will facilitate the assembly and mounting of the tubes into the manufactured article. In some cases, clips or other fastening devices are used to connect together two or more tubes into a bundle that can then be handled, shipped and installed as a bundled unit.

It would be desirable to provide further improvements in the routing of tubes in a motor vehicle or other a manufactured article by providing improved methods for bundling a plurality of tubes.

SUMMARY OF THE INVENTION

A plurality of tubes are connected in a bundle that is bent to follow a curved tortuous path. The method includes providing a plurality of individual tubes and then encapsulating the tubes within a molded or extruded encapsulating material so that the tubes are joined and supported together in a encapsulated tube bundle. Connectors are provided on the ends of the tubes, either before or after the encapsulating of the tubes. The encapsulated tube bundle is then bent to the desired bent tortuous shape.

Further areas of applicability of the present invention will become apparent from the detailed description provided hereinafter. It should be understood that the detailed description and specific examples, while indicating exemplary embodiments of the invention, are intended for purposes of illustration only and do not limit the scope of the invention.

BRIEF DESCRIPTION OF THE DRAWINGS

The present invention will become more fully understood from the detailed description and the accompanying drawings, wherein:

FIG. 5 shows the encapsulated tube bundle of FIG. 4 having been bent to follow a curved path.

FIG. 6 relates to a second embodiment of the invention and shows a plurality of tubes.

FIG. 7 shows the plurality of tubes of FIG. 6 feeding into an extrusion die in which an encapsulating material is extruded around the tubes.

DETAILED DESCRIPTION OF THE EXEMPLARY EMBODIMENTS

The following description of certain exemplary embodiments is merely exemplary in nature and is not intended to limit the invention, its application, or uses.

Figure 1:
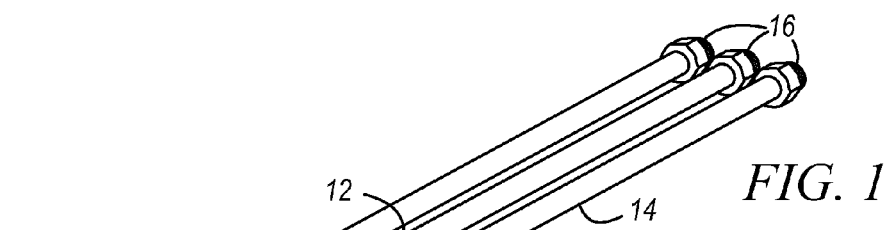
FIG. 1 is a perspective view showing a plurality of tubes having end connectors thereon.

Referring to FIG. 1, a plurality of tubes 10, 12, and 14 are shown and each to has a tube connector 16 installed on the end thereof. The tubes can be metal, such as steel, copper, brass, or can be a plastic material such as nylon, polyethylene, or polypropylene. The connectors 16 can be any conventional connector such as a flared connector, a compression connector, a swaged connector, or a quick connector.

Figure 2:
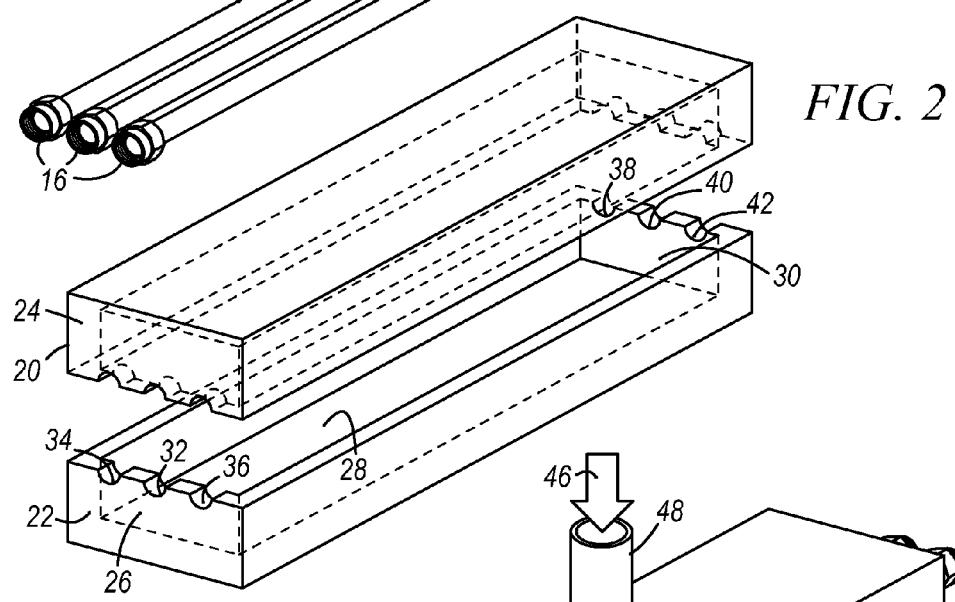
FIG. 2 shows a mold with the mold in the open position.

FIG. 2 shows a mold 20 for receiving the plurality of tubes 10, 12, and 14 and for molding an encapsulating material around the tubes 10, 12 and 14. The mold 20 includes a mold bottom 22 and a mold lid 24 which cooperate to define a mold cavity 28. Mold bottom 22 has end walls 26 and 30. The end wall 26 has a plurality of semicircular grooves 32, 34, and 36. End wall 30 has similar semicircular grooves 38, 40, and 42. The mold lid 24 also has end walls with semicircular grooves that match and register with the semicircular grooves 32, 34, 36, 38, 40, 42 of the mold bottom 22.

Figure 3:
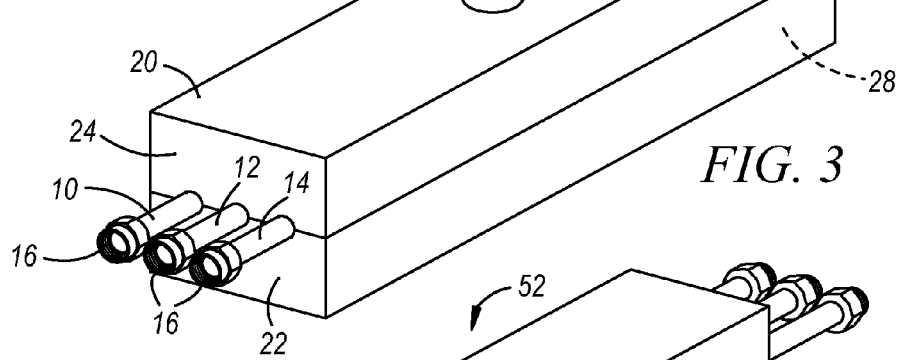
FIG. 3 shows the plurality of tubes of FIG. 1 positioned in the mold of FIG. 2 and the mold closed about the plurality of tubes for the injection of a tube encapsulating material.

In FIG. 3, the tubes 10, 12, and 14 have been positioned upon the grooves 32, 34, 36, 38, 40, 42 of the mold bottom 22 to support the tubes and the mold lid 24 has been closed. The ends of the tubes 10, 12, and 14, with the connectors 16, are extending out the ends of the mold 20. An encapsulating material 46 is injected into the mold 20 via sprue 48 to fill the mold cavity 28 of the mold 20 and thereby embed and encircle the tubes 10, 12, and 14 within the encapsulating material 46, thus forming an encapsulated tube bundle 52.

The encapsulating material is a polymer material that, upon curing, will retain sufficient flexibility to enable the encapsulated tube bundle 52 to be bent as will be discussed hereinafter. Examples of the plastic material are polyethylene, polypropylene, rubber, nylon, etc.

Figure 4:
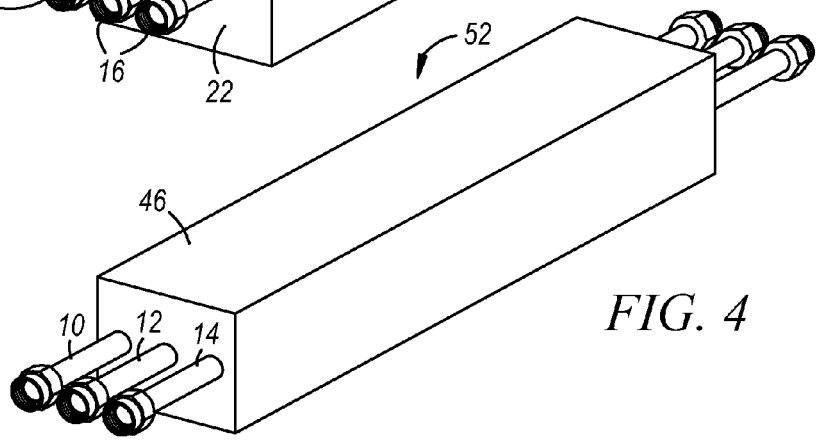
FIG. 4 shows the plurality of tubes encapsulated within the encapsulating material to provide an encapsulated tube bundle.

FIG. 4 shows the encapsulated tube bundle 52 removed from the mold 20. Thus, in FIG. 4, it is seen that the tubes 10, 12 and 14 are now embedded side-by-side within the encapsulating material 46, with the ends of the tubes 10, 12 and 14, and their connectors 16, projecting out the ends of the encapsulating material 46.

FIG. 5 shows the encapsulated tube bundle 52 of FIG. 4 bent to a curved shape, thereby forming the finished bent tube bundle 60, which will follow a curved tortuous path, for example between the front axle and the rear axle of a motor vehicle. Conventional tube bending equipment and methods are employed to perform the bending operation. For example, in some tube bending processes, the encapsulated tube bundle 52 is clamped at its center and then one end bent in the direction of arrow 56 and the other end bent in the direction of arrow 58. Other tube bending processes feed the encapsulated tube bundle 52 through automated computer controlled bending dies that will bend the encapsulated tube bundle 52 as the encapsulated tube bundle 52 is fed through the dies.

FIGS. 6 through 10 show a second embodiment in which the individual tubes will be encapsulated via an extrusion process. FIG. 6 shows a plurality of tubes 110, 112, and 114. The tubes are of continuous length and are shown being unreeled from tube coils 118, 120, and 122.

FIG. 7 shows an extrusion die 130. The back wall 132 of the extrusion die 130 has a plurality of round inlet holes 136, 138, and 140 that respectively receive the ends of the tubes 110, 112, and 114. The extrusion die 130 has an extrusion cavity 146, and the extrusion cavity 146 opens through an outlet opening 148. As the tubes 110, 112, and 114 feed through the extrusion cavity 146, encapsulating material 152 is injected through sprue 154 to surround and embed the tubes 110, 112, and 114. The encapsulating material 152 can be cured within the die 130, or a cooling chamber or cooling bath can be provided adjacent the die outlet opening 148. Upon cooling and curing of the encapsulating material 152, the plurality of tubes 110, 112, 114 have been fully encapsulated to provide an encapsulated tube bundle 158.

Figure 8:
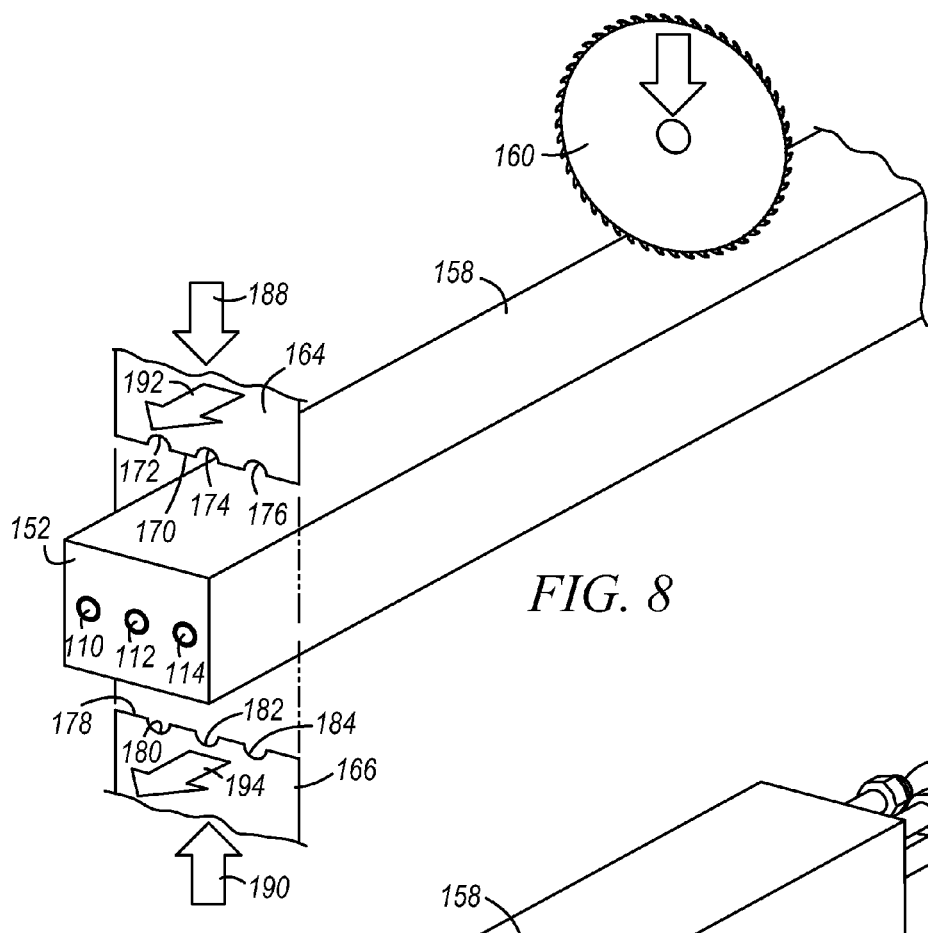
FIG. 8 shows the extrusion of FIG. 7 and stripping tools that will cut the encapsulating material and then strip a portion of encapsulating material from the end of the encapsulated tube bundle.

FIG. 8 shows a cut off tool 160 for cutting the encapsulated tube bundle 158 into desired lengths. The cut off tool 160 can be a circular saw blade as shown in the drawing, or can be a reciprocating saw blade, or other type of cutting tool. When the encapsulated tube bundle 158 is cut to length, the tubes 110, 112, and 114 will have their ends flush with the end of the encapsulating material 152. FIG. 8 also shows an upper stripping tool 164 and a lower stripping tool 166 that will be employed to strip away a portion of the encapsulating material 152 at the end of the encapsulated tube bundle 158 so that connectors 198 can be installed on the ends of the tubes. In particular, the upper stripping tool 164 has a cutting edge 170 that has a plurality of cutting grooves 172, 174, and 176. The lower stripping tool 166 has a similar cutting edge 178 and cutting grooves 180, 182, and 184. The upper stripping tool 164 will be lowered in the direction of arrow 188, while the lower stripping tool 166 will be moved upwardly in the direction of arrows 190, thus cutting the encapsulating material 152 around the tubes 110, 112, and 114. Then the stripping tools 164 and 166 will be moved leftwardly in the direction of arrows 192 and 194 to strip away a portion of the encapsulating material 152 and thereby expose the ends of the tubes 110, 112, and 114.

Figure 9:
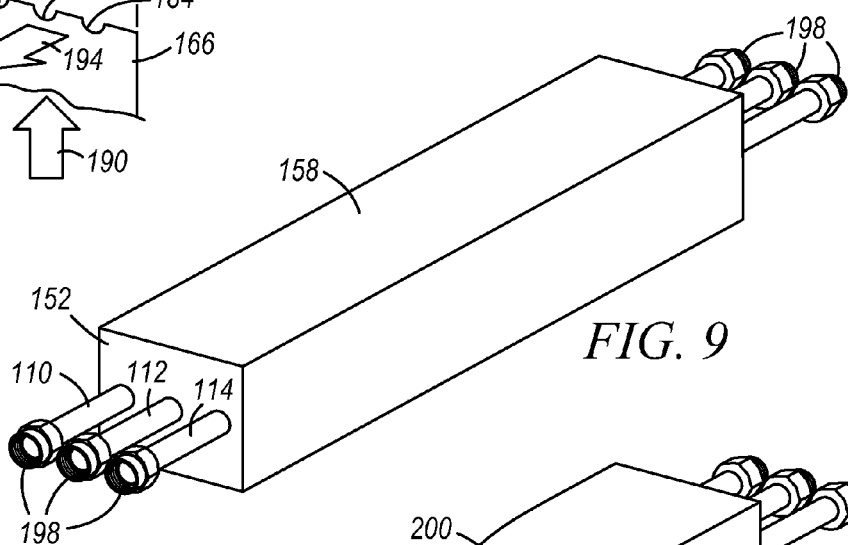
FIG. 9 shows tube connectors installed on the ends of the tubes.

In FIG. 9, tube connectors 198 are installed on the ends of the tubes 110, 112, and 114.

Figure 10:
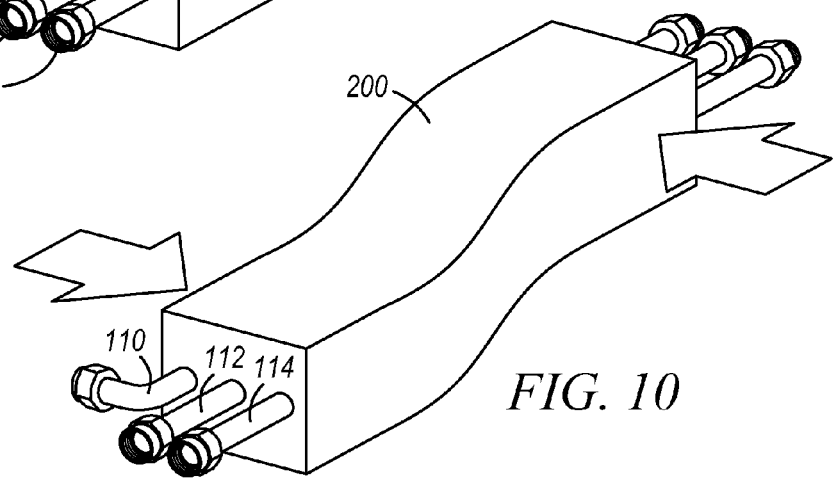
FIG. 10 shows the encapsulated tube bundle of FIG. 9 bent to follow a curved path.

FIG. 10 shows the encapsulated tube bundle 158 of FIG. 9 having been bent into a curved tortuous path to form the finished bent tube bundle 200. In addition, FIG. 10 shows that the tube 110 bent outwardly at 90° from the other tubes to facilitate connection of the tube 110 with a vehicle component.

The afore-described invention provides many advantages in the bundling of tubes for mounting in a motor vehicles or other manufactured article. The encapsulating material will serve to protect and support each of the plurality of tubes continuously all along the length of the tubes. The simultaneous bending of all of the tubes within the tube bundle to the desired bent shape provides manufacturing economies as compared to the more traditional individual bending of tubes. In addition, the tube bundle can be shipped from the manufacturing factory to a vehicle assembly plant with reduced risk of shipping damage and avoidance of entanglement problems that can result from the shipping of individual tubes. Furthermore, the encapsulated tube bundle facilitates the attachment of the tubes to a motor vehicle because the tubes are already assembled into a bundle and the bundle can be more readily attached to the vehicle than individually mounting a plurality of individual tubes. The encapsulating material insulates the tubes in a protective sheath against temperature extremes and accurately spaces the tubes apart which prevents rattles.

Many variations are available in the practice of the afore-described invention. In the embodiment of FIGS. 1 through 5, the connectors can be installed on the tubes prior to placing the tubes in the mold, or, alternatively, the connectors can be installed on the tubes after the tubes have been encapsulated within the encapsulating material. Furthermore, in the example of FIGS. 1 through 5, the encapsulating material can be molded about the tubes without the tubes extending through the end walls of the mold is shown in FIG. 3. Instead, the tubes can be molded flush with the encapsulating material and then the stripping tools 164 and 166 shown in FIG. 8 can be employed to remove an portion of the encapsulating material to expose the tube ends for installation of the connectors.

Although the drawings herein show the example of three tubes, any number of tubes can be bundled within the encapsulating material and then bent. The tubes can be of differing diameter and can be of differing materials. In addition, although the drawings herein show the encapsulating material molded or extruded in a rectangular cross-section, the bundle can have any cross-sectional shape that is desired.

Although FIG. 6 shows the tubes being continuous tubes that are unwound from storage coils, the tubes can be cut to length and then fed through the extrusion die 130. In addition, the encapsulated tube bundle 158 can be coiled as it emerges from the extrusion die 134 shipment or storage. Then, at some later time or different location, the encapsulated tube bundle 158 can be uncoiled, cut to length, connectors installed, and bent to the curved tortuous shape.

The bending of the tube bundle as described in FIGS. 5 and 10 can be performed using conventional bending equipment. Once the tube bundle is bent to its desired shape, the desired shape will be retained by either the stiffness of the tubes, stiffness of the encapsulating material, or a combination of the stiffness of the tubes and stiffness of the encapsulating material. For example if the tubes are relatively stiffer, then the encapsulating material can be a soft and pliable foam, in which case the tubes will provide the stiffness by which the tube bundle will maintain its bent shape. On the other hand, the tubes can be relatively flexible, such as flexible plastic or braided tubes, and then the encapsulating material can be relatively stiffer so that the bent shape will be maintained by the stiffness of the encapsulating material.

What is claimed is:

1. A method for making a tube bundle of individual tubes attached together side-by-side and bent to follow a tortuous path, comprising:
   providing a plurality of tubes;
   encapsulating the plurality of tubes side-by-side within a curable encapsulating material surrounding the tubes so that the individual tubes are attached together side-by-side by the encapsulating material, upon curing said encapsulating material retaining flexibility to enable the encapsulating material to be bent;
   installing connectors on the ends of the tubes;
   and after curing, bending both the plurality of tubes and the encapsulating material to a desired bent shape following a tortuous path after the plurality of tubes have been encapsulated within the cured encapsulating material, said desired bent shape following the tortuous path being retained by either a stiffness of the tubes, a stiffness of the encapsulating material, or a combination of a stiffness of the tubes and a stiffness of the encapsulating material so that the tube bundle is self supporting along the tortuous path.

2. The method of claim 1 further comprising the plurality of tubes being supported side-by-side in an injection molding die and the encapsulating material being injected about the tubes.

3. The method of claim 2 further comprising the connectors being installed on the ends of the tubes prior to supporting the tubes in the injection molding die.

4. The method of claim 2 further comprising the connectors being installed on the ends of the tubes after the tubes are supported within the die or after the tubes have been encapsulated within the encapsulating material.

5. The method of claim 1 further comprising after the tubes have been encapsulated within the encapsulating material, stripping a portion of the encapsulating material away from the ends of the tubes and then installing the connectors on the ends of the tubes.

6. The method of claim 1 further comprising the plurality of tubes being fed through an extrusion die and the encapsulating material being extruded about the tubes to form an encapsulated tube bundle.

7. The method of claim 6 further comprising after encapsulating the plurality of tubes within the encapsulating material to form the encapsulated tube bundle, then coiling the encapsulated tube bundle for storage, then later uncoiling and bending the encapsulated tube bundle to the desired bent shape following a tortuous path.

8. The method of claim 6 further comprising after extruding the encapsulating material about the plurality of tubes to form the encapsulated tube bundle, then cutting the encapsulated tube bundle into desired lengths and stripping a portion of the encapsulating material to expose the ends of the tubes so that the connectors can be installed.

9. The method of claim 8 further comprising bending the tubes and encapsulating material to the desired bent shape after the ends have been stripped and the connectors installed.

10. The method of claim 8 further comprising bending the tubes and encapsulating material to the desired bent shape before the ends have been stripped and the connectors installed.

11. A method for making a tube bundle of individual tubes attached together side-by-side and bent to follow a tortuous path, comprising:
providing a plurality of tubes;
supporting the plurality of tubes side-by-side in an injection molding die;
injecting a curable encapsulating material into the injection molding die to surround the side-by-side tubes and make an encapsulated tube bundle by encapsulating and attaching together the plurality of tubes side-by-side within the encapsulating material, upon curing said encapsulating material retaining flexibility to enable the encapsulated tubing bundle to be bent;
installing connectors on the ends of the tubes;
and after curing, bending both the encapsulated tube bundle to a desired bent shape following a tortuous path, said desired bent shape following the tortuous path being retained by either a stiffness of the tubes, a stiffness of the encapsulating material, or a combination of a stiffness of the tubes and a stiffness of the encapsulating material so that the encapsulated tube bundle is self supporting along the tortuous path.

12. The method of claim 11 further comprising the connectors being installed on the ends of the tubes prior to supporting the tubes in the injection molding die.

13. The method of claim 11 further comprising the connectors being installed on the ends of the tubes after the tubes are supported within the die or after the tubes have been encapsulated within the encapsulating material.

14. The method of claim 11 further comprising after the tubes have been encapsulated within the encapsulating material, stripping a portion of the encapsulating material away from the ends of the tubes and then installing the connectors on the ends of the tubes.

15. A method for making a tube bundle of individual tubes attached together side-by-side and bent to follow a tortuous path, comprising:
providing a plurality of tubes;
feeding the plurality of tubes side-by-side into an extrusion die;
injecting a curable encapsulating material into the extrusion die to surround the side-by-side tubes and thereby make an encapsulated tube bundle by encapsulating the plurality of tubes within the encapsulating material, upon curing said encapsulating material retaining flexibility to enable the encapsulated tube bundle to be bent;
installing connectors on the ends of the tubes;
and after curing, bending the encapsulated tube bundle to a desired bent shape following a tortuous path, said desired bent shape following the tortuous path being retained by either a stiffness of the tubes, a stiffness of the encapsulating material, or a combination of a stiffness of the tubes and a stiffness of the encapsulating material so that the encapsulated tube bundle is self supporting along the tortuous path.

16. The method of claim 15 further comprising cutting the encapsulated tube bundle to a desired length after encapsulating the tubes and stripping a portion of the encapsulating material to expose the ends of the tubes and enable the installation of the connectors on the ends of the tubes.

17. The method of claim 16 further comprising bending the encapsulated tube bundle to the desired bent shape after the ends have been stripped and the connectors installed.

18. The method of claim 16 further comprising bending the encapsulated tube bundle to the desired bent shape before the ends have been stripped and the connectors installed.

19. The method of claim 16 further comprising after the tubes are encapsulated to make the encapsulated tube bundle, coiling the encapsulated tube bundle for storage, and then later uncoiling the encapsulated tube bundle and cutting the encapsulated tube bundle to a desired length after encapsulating the tubes and stripping a portion of the encapsulating material to expose the ends of the tubes and enable the installation of the connectors on the ends of the tubes.

20. A bent tube bundle comprising: a plurality of tubes extending side-by-side longitudinally and embedded within a sheath of plastic encapsulating material that extends continuously along the tubes, said tubes having ends extending from the sheath of plastic encapsulating material and having connectors on ends of the tubes, and said tubes and plastic encapsulating material bent to follow a tortuous path, said desired bent shape following the tortuous path being retained by either a stiffness of the tubes, a stiffness of the encapsulating material, or a combination of a stiffness of the tubes and a stiffness of the encapsulating material so that the encapsulated tube bundle is self supporting along the tortuous path.

* * * * *